United States Patent [19]

Pipkin

[11] 4,036,451
[45] July 19, 1977

[54] HOOK AND LEADER STORAGE DEVICE

[76] Inventor: Denzil B. Pipkin, 20626 Cypress, Alderwood Manor, Wash. 98036

[21] Appl. No.: 710,253

[22] Filed: July 30, 1976

[51] Int. Cl.$^2$ .................... B65H 45/18; B65D 85/66
[52] U.S. Cl. ............................ 242/137.1; 206/389; 206/402
[58] Field of Search ............... 242/137, 137.1, 138, 242/140, 141; 206/389, 390, 402, 407–409

[56] References Cited

U.S. PATENT DOCUMENTS

| 1,850,074 | 3/1932 | Crandall | 242/84.1 |
| 2,517,866 | 8/1950 | Glahn | 242/137.1 |
| 2,517,867 | 8/1950 | Glahn | 242/137.1 |
| 2,585,327 | 2/1952 | Johnson et al. | 242/138 |

FOREIGN PATENT DOCUMENTS 572,464  6/1958  Italy .................................. 242/137.1

Primary Examiner—Leonard D. Christian
Attorney, Agent, or Firm—Seed, Berry, Vernon & Baynham

[57] ABSTRACT

A hook and leader storage device contains a reel in which pretied hooks are stored and around which their attached leaders are wound in a common direction after being passed through ports in the reel and in a container in which the reel is journaled, the reel being rotated to wind the leaders responsive to manual turning of a removable cover on the container or direct manual turning of the reel. Relatively short leaders are pulled from the reel while stationary.

11 Claims, 5 Drawing Figures

U.S. Patent July 19, 1977 4,036,451
FIG. 1
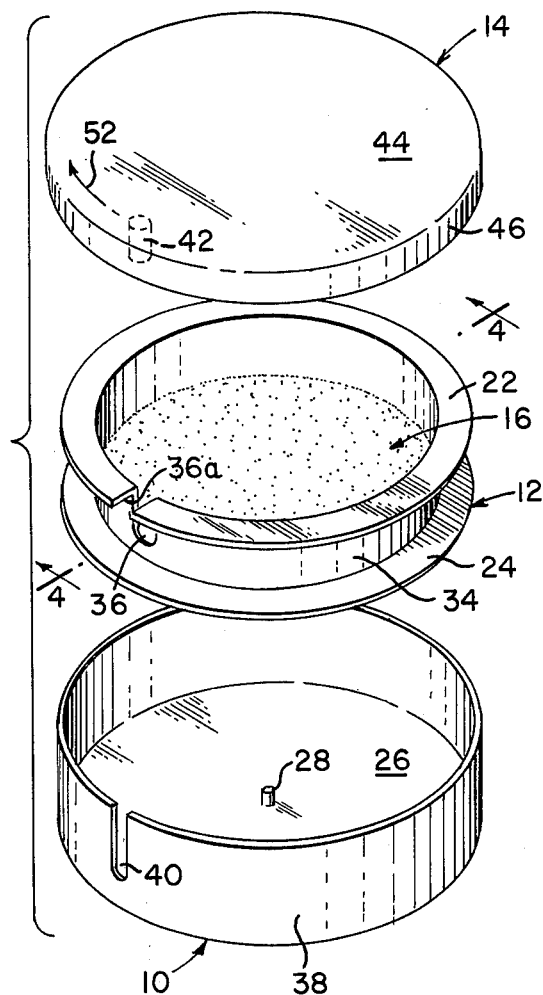
FIG. 2
FIG. 3
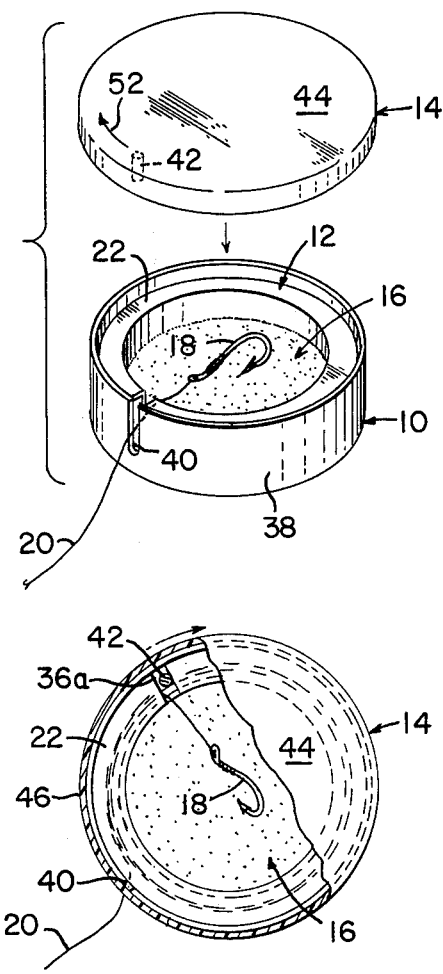
FIG. 4
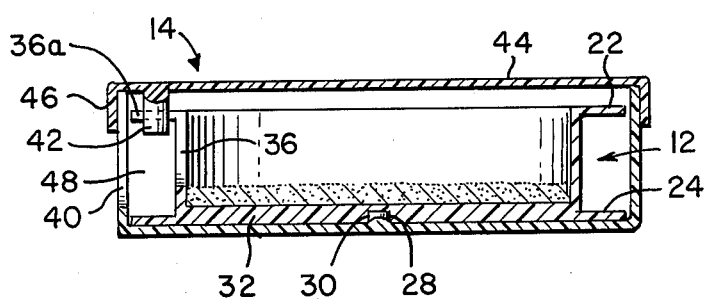
FIG. 5
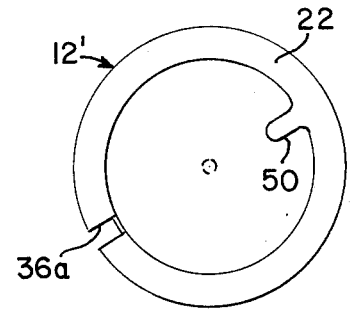

HOOK AND LEADER STORAGE DEVICE

BACKGROUND OF THE INVENTION

Field of the Invention

The present invention relates to a storage device for hook and leader units of the type in which the units can be individually placed in storage position and selectively removed for use.

SUMMARY OF THE INVENTION

The need for a compact storage device for pretied hooks which is easy and convenient to use, particularly in cold or windy conditions, has long been recognized by fishermen.

The present invention aims to fill this need and at the same time provide a device which is of simple and economical construction.

A further object is to provide a hook and leader storage device which can be loaded one or more units at a time, and permits any selected hook to be removed with its leader for use without disturbing the other stored units.

In carrying out the present invention there is provided a reel in which the hooks are stored and around which the leaders are wound after passing through a leader port in the reel. In the first embodiment the reel is journaled in a housing and is turned by turning of a removable cover on the container which has a driving engagement with the reel. A leader port is provided in the container to register with that in the reel. To store a hook and leader unit, the hook is anchored within the reel with its leader passing through the ports, and then the cover is turned to wind the leader on the reel. As the leader is wound it threads inwardly through the leader port in the container. A selected hook and leader unit can be removed for use merely by pulling on the hook whereupon the leader unwinds from the reel while stationary and threads inwardly through the leader port in the reel.

In a second embodiment for longer leaders the reel has a finger grip for turning it directly rather than by turning the cover, and the leader is pulled outwardly through the port in the container to unwind the leader by responsive turning of the reel.

BRIEF DESCRIPTION OF THE FIGURES OF THE DRAWING

FIG. 1 is an exploded perspective view of a storage device embodying the present invention;

FIG. 2 is a perspective view to a reduced scale showing commencement of the storage operation;

FIG. 3 is a top plan view with part of the cover broken away and illustrating near completion of the storage operation; and FIG. 4 is a vertical sectional view taken as indicated by line 4—4 in FIG. 1, and with the leader ports in the container and reel shown in registration.

FIG. 5 is a top plan view of an alternative reel component for use with a second embodiment of the storage device.

DETAILED DESCRIPTION OF THE INVENTION

Referring to the drawings, it is seen that the device of the present invention comprises a container 10, reel 12, cover 14, and a hook anchoring pad 16. The first three of these elements may be formed of a suitable plastic such as polyethylene and the pad 16 may be cork or a suitable fabric for receiving and anchoring the sharp top portion of the bill of a hook 18 having an attached leader 20.

The container 10 is preferably circular and slightly larger in diameter than the upper and lower rim flanges 22, 24 of the reel 12. Projecting upwardly from the center of the container bottom wall 26 is an axle stub 28 having a snap interfit with a bore 30 in the opposing base 32 of the reel.

It will be noted that the sidewall 34 and upper rim flange 22 of the reel 12 are notched to form an inner port 36, and that the sidewall 38 of the container 10 is also notched from the top to form an outer port 40 arranged to radially register with the inner port 36 when the reel is turned the proper amount on the axle 30. For turning the reel the cover 14 presents a driving lug or pin 42 which projects downwardly from the top wall 44 of the cover a radial distance from the center thereof corresponding to the central portion of the upper rim flange 22 so as to be adapted to fit into the mouth portion 36a of the inner port 36 when the cover 14 is in place on the container 10. In this regard, the cover 14 has an annular sidewall 46 which is shallower than the depth of the outer port 40 so that when the cover is in place the bottom portion of the outer port remains exposed as shown in FIG. 4. The fit of the cover 14 on the container 10 is loose enough to permit the cover to be readily turned relative to the container.

The interior of the reel 12 serves as a hook storage zone and is purposely open at the top for easy access to the hook anchoring pad 16 when the cover 14 is removed from the container 10. It is preferred that the pad 16 be fixed in position as by an adhesive bond to the reel base 32 and that the pad be of such a material and thickness as to readily receive the bill of a hook without the hook barb becoming interlocked with the pad in a manner making it difficult to remove the hook when desired. Although a pad has been indicated as the hook anchoring means, it is to be understood that this is by way of example only, and that other such means well known in the art may be substituted.

When the reel 12 is journal mounted in the container 10, the annular space between the rim flanges 22, 24 of the reel and between the reel and container sidewalls 34, 38 becomes a leader storage zone 48 which has communication to the outside by outer port 40 and to the hook storage zone within the reel via the inner port 36. When a hook and leader unit is stored in the assembly of the invention the hook 18 and hook end portion of the leader 20 occupy the hook storage zone in the reel and the rest of the leader is coiled about the reel in the leader storage zone 48.

The manner in which a hook and leader unit is placed in storage position is illustrated in FIGS. 2–3 and will now be described. With the cover 14 removed and the reel turned to place the ports 36, 40 in radial alignment, the bill of the hook 18 is inserted into the anchoring pad 16 and the leader 20 is passed through the ports as shown in FIG. 2. Then the cover is placed over the container with the pin 42 registering with the mouth 36a of the inner port so as to be in reel driving position. As indicated by the curved arrow in FIG. 3, the cover 14 is then turned on the container 10 sufficient rotations to wind the leader on the reel as reel turns in the container together with the cover. As the leader winds on the reel it is pulled into the leader storage zone 48 through the outer port 40 beneath the rim of the cover.

Although only one is shown in the drawing, many hook and leader units can be placed in storage position in the above-described manner, either one at a time, or several at a time. It is important that the cover 14 always be turned in the same direction when the leaders are being wound on the reel 12, and as a remainder of this, the cover is preferably marked with a directional arrow 52.

When it is desired to remove one of the hook and leader units from storage for use, it is only necessary to remove the cover 14, free the selected hook from the hook anchoring means 16, and pull the hook out of the inside of the reel. As the hook is pulled the respective leader is drawn inwardly through the inner port 36 and unwinds from the then stationary reel without disturbing the other hook and leaders.

With leaders up to a length of about six feet the leaders will freely unwind from a stationary reel as above described. However, for some sports fishing, as for example, salmon fishing, some fisherman when using herring as the lure with double hooks, use leaders about nine feet in length, and these leaders will not pull free from a stationary reel of a reasonably small diameter for compactness, because of the number of wraps on the reel required. Accordingly, a modified version of the above described apparatus has been developed for these long leaders. This modification comprises two changes. First, the driving pin 42 is eliminated; and secondly, a finger grip or handle is provided on the reel for convenience in manually turning the reel in the container 10 when the cover 14 is removed. Such a grip or handle is shown at 50 in modified reel 12' in FIG. 5. In the illustrated form, the handle 50 comprises an inwardly projecting rib integral with the sidewall 34.

The modified storage unit is loaded as before, except that the reel is turned to wind the leaders thereon by manually pushing on the handle 50 rather than turning the cover 14. To remove a hook and leader assembly after freeing the hook from the pad 16, the hook and portion of the leader is passed radially outwardly through the ports 36 and 40, and then is pulled outwardly or tangentially of the reel with one hand while the other hand grips the container. As the leader moves outwardly through the port 40 responsive to being pulled, the reel 12' responsive turns in the container in the same direction as the leader was initially wound. Such turning of the reel can be accomplished with or without the cover in place and does not disturb the other hook and leader units stored in the device.

If desired, the first embodiment of the invention can also be used with longer leaders by winding the leaders onto the reel by turning the cover as before described, and than removing the leader, with the cover removed, by pulling it through the container port 40 as described respecting the second embodiment. Alternatively, the cover can be given a relatively loose fit relative to the container so that it will readily turn with the reel when a leader is being removed.

From the foregoing description it is seen that the elements of both forms of the invention cooperate in a novel manner to give a compact storage device and make both insertion and removal of hook and leader units easy to accomplish. It will be apparent that modifications can be made in the described preferred embodiment without departing from the teachings of the invention, and hence the annexed claims are to be interpreted accordingly.

The embodiments of the invention in which a particular property or privilege is claimed are defined as follows:

1. A hook and leader storage device comprising:
    a container,
    a reel journaled in the container and having a hook storage zone, said reel having a leader storage zone therearound within said container,
    hook anchoring means in the hook storage zone,
    inner port means in the reel for the passage of leaders from hooks anchored in the hook storage zone to the leader storage zone,
    outer port means in the container arranged to be placed in registration with said first port means responsive to turning of the reel, whereby a leader tied to a hook placed in anchored position in the hook storage zone can be passed radially outward through said inner and outer port means with its free end outside of the container and then can be wound on the reel to occupy the leader storage zone by turning the reel in the container.

2. A hook and leader storage device according to claim 1 in which said hook storage zone is exposed at one axial end of the reel, and cover means for selectively covering said hook storage zone and giving access thereto.

3. A hook and leader storage device according to claim 2 in which said leader storage zone is also exposed at said one axial end and said cover means also selectively covers the leader storage zone.

4. A hook and leader storage zone according to claim 3 in which inner and outer ports are exposed at said one axial end and said cover means overlies said ports when the cover means is in a position covering said zones.

5. A hook and leader storage device according to claim 1 in which said zones and said inner port are exposed at one axial end of said reel,
    detachable rotary cover means on said container for selectively covering said zones and having a driving lug projecting into said inner port for turning said reel responsive to manual turning of said cover means relative to said container.

6. A hook and leader storage device according to claim 5 in which said outer port is also exposed at said one axial end.

7. A hook and leader storage device according to claim 1 in which said zones and said ports are exposed at one axial end of the reel, and
    detachable cover means turnable on the container and having a driving interfit with said reel for turning the reel in the container responsive to manual turning of the cover means on the container.

8. A hook and leader storage device according to claim 7 in which said cover means has an exterior port alined with said outer port when said cover means has said driving interfit, said exterior port being exposed toward the opposite axial end of the reel.

9. A hook and leader storage device according to claim 1 in which said reel has a finger grip and said container has a removable cover giving access to said hook storage zone and said finger grip.

10. A hook and leader storage device comprising:
    a reel,
    anchoring means for anchoring hook on the reel,
    access means to said anchoring means,
    leader storage means containing the reel, leader passage means from said anchoring means, through said leader storage means and access means to the outside, and means for turning said reel relative to said leader storage means when a hook is anchored by said anchoring means and has its leader passing by its free end to the outside through said leader passage means, to thereby wind the leader on the reel.

11. A hook and leader storage device according to claim 9 in which said access means is rotatably mounted on said leader storage means and has driving engagement with said reel whereby the reel is turned responsive to manual turning of said access means.

* * * * *